DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 9

T925,005

COPOLYESTER HOT MELT ADHESIVE TEXTILE FIBERS

Shen S. Chen, 840 Teasel Drive, C7–1 37660, and Fred F. Chen, 3919 Bond St., 37664, both of Kingsport, Tenn.

Filed Oct. 1, 1973, Ser. No. 402,246

Int. Cl. C08g *17/06;* A41h *27/00*

U.S. Cl. 260—75 R

No Drawing. 9 Pages Specification

This invention relates to textile fibers of a composition comprising a copolyester of terephthalic acid, adipic acid, ethylene glycol, and 1,4-butanediol. These fibers can be processed into threads, fabrics or webs for use in hemming, seaming or interlining fabrics.